April 6, 1926.
C. GIRL
AUTOMOBILE BUMPER
Filed June 27, 1925
1,579,522
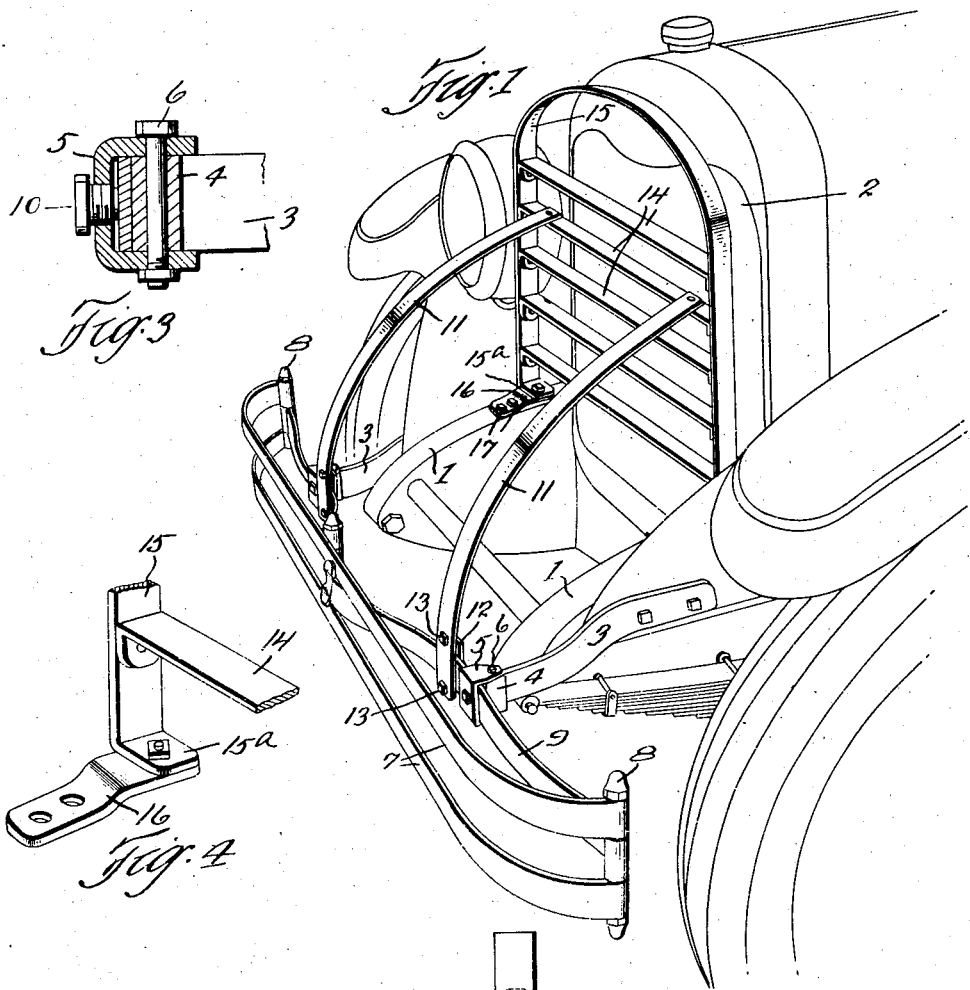
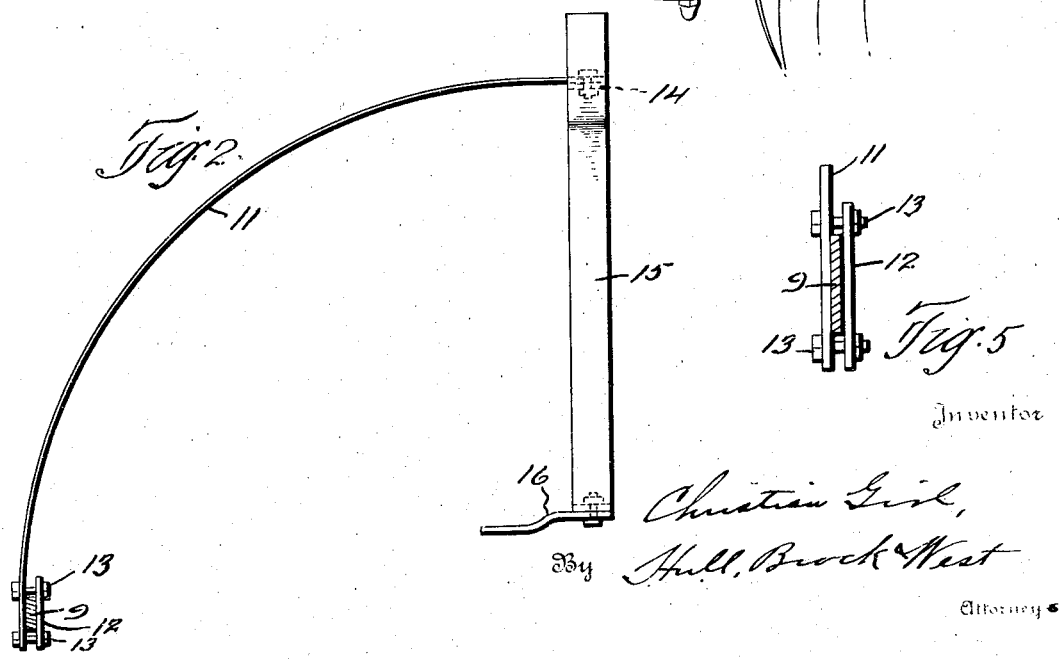
Inventor
Christian Girl,
By Hull, Brock & West
Attorneys Patented Apr. 6, 1926.

1,579,522

UNITED STATES PATENT OFFICE.

CHRISTIAN GIRL, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed June 27, 1925. Serial No. 39,914.

*To all whom it may concern:*

Be it known that I, CHRISTIAN GIRL, a citizen of the United States, residing at Detroit, in the county of Wayne and State of Michigan, have invented a certain new and useful Improvement in Automobile Bumpers, of which the following is a full, clear, and exact description, reference being had to the accompanying drawings.

This invention relates to bumpers, and more particularly to bumpers for the protection of the ends of automobiles, the embodiment shown herein being particularly adapted for the protection of the front ends and the radiators of such vehicles.

The general object and purpose of the invention is to provide a bumper structure which may be conveniently applied to and removed from the cooperating end of the car, and which, when in place, will afford efficient protection for the end of the car.

A further object of the invention is to provide a bumper structure of this character having a guard member which is adapted particularly for use in protecting the front ends and radiators of such car.

Further and more limited objects of the invention will be set forth in the specification and are realized through the construction shown in the drawings wherein Fig. 1 represents a perspective view of the front end of an automobile having my invention applied thereto; Fig. 2 is a side elevation of the radiator bumper or guard; Fig. 3 is a vertical sectional view through the upper end of one of the supporting arms and the corresponding clamp by which the lower bumper is secured to the vehicle; Fig. 4 is a detail in perspective of a portion of the radiator guard; and Fig. 5 is a detail in sectional elevation of the connection between one of the radiator side bars and the lower bumper.

Describing the various parts by reference characters, 1 denotes the front ends of the side members of an automobile and 2 denotes the radiator thereof. 3 denotes an arm secured to each side member 1, each arm being provided with an eye 4 at its front end. The arms support, through U-shaped clamps 5 and pivot bolts 5, a bumper which may be of any approved construction, the one illustrated being of the type shown, described and claimed in McGregor Patent No. 1,372,154, issued March 22, 1921, and comprising a pair of front bars 7, vertically spaced and connected at their ends by bolts 8 with the ends of the rear bar 9, said rear bar having its center projected between and connected to the centers of the bars 7. The bumper thus described is supported by the arms 3 and the clamps 5 by slipping the clamps over the rear bar 9 and then inserting the pivot bolts 6 in place, after which the bar 9 may be forced against the fronts of the eyes 4 by means of set screws 10.

The radiator guard as shown herein comprises a pair of upwardly and rearwardly curved resilient bars 11 each having its lower end secured to the rear bar 9 of the lower transverse bumper by means of a clamping plate 12 and bolts 13. The upper ends of the bars 11 are secured, as by riveting, to one of the cross bars 14 within an inverted U-shaped frame 15 each side member of which is provided with a foot 15ª secured to a bearing plate 16 which in turn is secured by bolts 17 to the appropriate side member 1. The frame 15 preferably approximates the contour of the radiator as viewed from in front and is spaced from and in front of the radiator.

The construction shown and described herein affords complete protection to the end of the car to which it is applied and, as to some of its specific details, is particularly adapted for the protection of the front ends and radiators of such cars.

Having thus described my invention, what I claim is:—

1. The combination, with the side members of an automobile, of arms secured to and projecting forwardly from the said side members, a bumper secured to the ends of the said arms and extending transversely of the said members, side bars secured to said bumper and extending upwardly and away from said bumper, and means for supporting the upper ends of the said bars from the said side members.

2. The combination, with the frame of an automobile, of a bumper supported by and extending transversely of the said frame, side bars secured to said bumper and extending upwardly and away from said bumper, and means for supporting the upper ends of the said bars from the said frame.

3. The combination, with the side members of an automobile, of arms secured to and projecting from the said side members, a bumper comprising a bar secured to and extending between the outer ends of said arms, a pair of side bars secured at their lower ends to the first bar and extending upwardly and away from such bar, and means for supporting the upper ends of the side bars from the side members.

4. The combination, with the frame of an automobile, of arms secured to and projecting from the said frame, a bumper comprising a bar secured to and extending between the outer ends of said arms, a pair of side bars secured at their lower ends to the first bar and extending upwardly and away from such bar, and means for supporting the upper ends of the side bars from the said frame.

5. Protecting means for the end of an automobile, the said means comprising a lower transverse bumper, side bars secured at their lower ends to the said bumper and extending upwardly and away from such bumper, a cross bar to which the upper ends of the side bars are secured, and legs supporting the said cross bar and adapted to be attached to the side members of the automobile.

6. Protecting means for the end of an automobile the said means comprising a lower transverse bumper, side bars secured at their lower ends to the said bumper and extending upwardly and away from such bumper, and legs supporting the said side bars and adapted to be attached to the frame of an automobile.

7. Protecting means for the end of an automobile, the said means comprising a bumper adapted to extend transversely of such automobile, side bars secured at their lower ends to said bumper and extending upwardly and away from the latter, a transverse bar connecting and supporting the upper ends of the side bars, and an inverted U-shaped frame supporting the last mentioned bar and adapted to be secured to the automobile frame.

8. Protecting means for the end of an automobile, the said means comprising a pair of side bars with means for supporting the lower ends of said bars from the automobile frame, an inverted U-shaped frame adapted to be secured to the automobile frame, and means connecting the upper ends of the side bars to the second-mentioned frame.

9. Protecting means for the end of an automobile comprising a pair of side bars adapted to be supported from the frame of an automobile, the said side bars extending upwardly and away from such lower points of support, an inverted U-shaped frame having a plurality of transverse bars and supported from the said automobile frame, and means connecting the side members to one of the said transverse bars.

10. Protecting means for the end of an automobile, the said means comprising an inverted U-shaped frame adapted to be secured to the automobile frame, and means for supporting the first-mentioned frame from the automobile frame.

11. Protecting means for the end of an automobile comprising an inverted U-shaped frame having a plurality of transverse bars, and means for supporting the sides of the said frame from the automobile frame.

In testimony whereof, I hereunto affix my signature.

CHRISTIAN GIRL.